US008720079B2

(12) United States Patent  (10) Patent No.: US 8,720,079 B2
Neufeld et al.  (45) Date of Patent: May 13, 2014

(54) MODULAR AERATION ASSEMBLY FOR GRAIN BINS

(75) Inventors: Juan Neufeld, Winkler (CA); Bernie Thiessen, Winkler (CA)

(73) Assignee: Woodhaven Capital Corp. (CA)

( * ) Notice: Subject to any disclaimer, the term of this patent is extended or adjusted under 35 U.S.C. 154(b) by 753 days.

(21) Appl. No.: 12/868,861

(22) Filed: Aug. 26, 2010

(65) Prior Publication Data

US 2012/0047762 A1    Mar. 1, 2012

(51) Int. Cl.
  *F26B 9/06*    (2006.01)
(52) U.S. Cl.
  USPC ................ 34/174; 34/175; 34/179; 34/181; 34/232; 34/233
(58) Field of Classification Search
  USPC ........... 34/165, 166, 168, 174, 175, 179, 181, 34/182, 183, 218, 232, 233, 235
  See application file for complete search history.

(56) References Cited

U.S. PATENT DOCUMENTS

| | | | |
|---|---|---|---|
| 2,654,590 A | | 10/1953 | Molenaar |
| 4,754,557 A | * | 7/1988 | Anderson ........................ 34/174 |
| 5,265,347 A | * | 11/1993 | Woodson et al. ................. 34/58 |
| 7,568,297 B2 | | 8/2009 | Pierson et al. |

FOREIGN PATENT DOCUMENTS

CA    1 251 038 A    3/1989

OTHER PUBLICATIONS

The Rocket, www.grainguard.ca/products.aspx?x=yWf3k12BOHO7S91K%2bXP8SX23Q6pzezyw, printed from Internet Aug. 11, 2010, 1 page.
Farm Systems, AG Growth International, Farm System Conceptual Drawing, 1 page.
"The Rocket" Grain Guard, Grain Handling Cat 60224, p. 10, May 27, 2010.
Farm Grain Handling, Farm Grain Conditioning, 1 page.
Three photos of the Rocket by Edward's Grain Guard, 3 pages.

* cited by examiner

*Primary Examiner* — Jiping Lu
(74) *Attorney, Agent, or Firm* — McKee, Voorhees & Sease, P.L.C.

(57) ABSTRACT

A grain aeration assembly is provided for a hopper bottom bin, and includes a plurality of curved wall segments sized to pass through the manhole of the bin. The wall segments are assembled inside the bin to form a cylindrical tower extending upwardly. The wall segments include an internal frame and inner and outer screens. The tower is supported above the sloped floor of the bin by a plurality of legs. An air conduit extends between the tower and an exterior fan, which provides forced air into the space between the inner and outer screens of the wall segments. The air flows outwardly through the screens, while grain or stored material is prevented from passing through the screens into the wall segments.

14 Claims, 6 Drawing Sheets

US 8,720,079 B2

MODULAR AERATION ASSEMBLY FOR GRAIN BINS

BACKGROUND OF THE INVENTION

Grain bins are often used for storing and drying various agricultural grains, such as corn and soybeans. Various types of aeration systems are often utilized to provide drying air into the bin. There are two general forms of bins, flat bottom bins and sloped or hopper bottom bins. The types of aeration systems vary depending upon the type of bin.

For hopper bottom or sloped floor bins, one prior art aeration system, "The Rocket" sold by Edward's Grain Guard of Alberta, Canada, utilizes a centrally located vertical aeration tube extending upwardly from the bottom of the bin, with perforations in the cylindrical tube wall to provide drying air to the grain in the bin. The Rocket has a hollow center core to increase the amount of available air flow into the grain and to reduce the obstructive nature of the unit by allowing grain to flow downwardly through the hollow center during discharge through the bin's central discharge opening in the floor.

Due to its integral construction and size, The Rocket must be installed during construction of the grain bin, and can not be retrofit into existing grain bins. Unfortunately, structural failure of such vertical aeration tubes may arise due to the high forces created during discharge of the grain in a hopper bottom bin. Such failure requires that a portion of the bin's sidewall be cut out to remove the aeration system and install a new system, and then replace or re-weld the sidewall back in place. Such repair of failed aeration systems is costly and undesirable.

Furthermore, some hopper bottom bins are constructed without aeration systems, only to discover later that an aeration system is needed. Again, the integral construction and size of prior art vertical tube aeration systems precludes a retrofit installation. Typically, the sheet metal walls of the aeration tube are factory assembled using rivets and self-drilled sheet metal screws, which are not reasonably feasible to field assembly within a bin. Therefore, prior art vertical aeration systems, such as The Rocket, must be installed at the time of the original manufacture or assembly of the grain bin.

Accordingly, a primary objective of the present invention is the provision of a modular aeration assembly for use in grain bins.

Another objective of the present invention is the provision of a modular aeration system which can be retrofit into existing grain bins.

A further objective of the present invention is the provision of a modular aeration assembly having separate components which can pass through the standard manhole in the sidewall of the bin for assembly within the bin.

Another objective of the present invention is the provision of a method for assembling an aeration system inside a grain bin.

Yet another objective the present invention is the provision of a modular aeration assembly for grain bins which is economical to manufacture and install, and durable and efficient in use.

These and other objectives will become apparent from the following description of the invention.

SUMMARY OF THE INVENTION

The modular aeration assembly of the present invention includes a plurality of curved wall segments sized to pass through the manhole in the sidewall of the bin for assembly inside the bin. When assembled, the curved wall segments form a cylindrical tower or tube extending upwardly inside the bin. A plurality of legs extends between the tower and the hopper bottom to support the tower within the bin. Each wall segment has a frame with spaced-apart inner and outer perforated skins or screens. A modular air conduit also passes through the manhole for connection to the tower inside the bin and to a fan or air source outside the bin, so as to direct air into the space between the inner and outer skins of the wall segments. Additional wall segments can be stacked one upon another to extend the height of the tower within the bin.

DETAILED DESCRIPTION OF THE PREFERRED EMBODIMENTS

Figure 1:
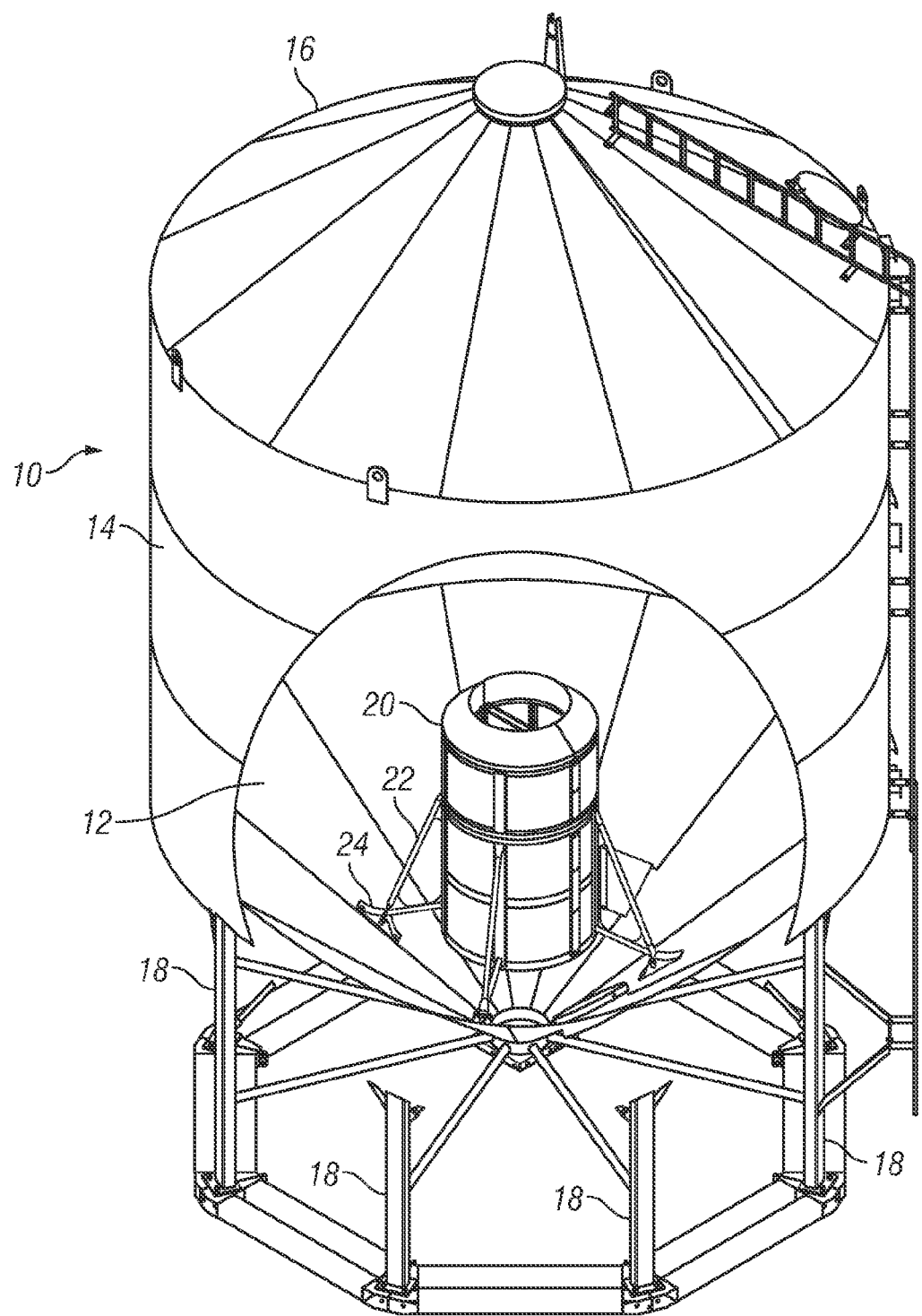
FIG. 1 is a perspective view of a hopper bottom grain bin with a portion of a sidewall cut away to show the modular aeration assembly of the present invention installed within the bin.

A hopper bottom grain bin is generally designated in the drawings by the reference 10. The bin 10 includes a sloped floor 12, a sidewall 14, a top 16, and a plurality of support legs 18. The bin 10 includes a manhole (not shown in the drawings) in the floor 12 or in the sidewall 14 for access to the interior of the bin. A door (not shown) opens and closes relative to the manhole. It is understood that the size and dimensions of the bin 10 can vary from those shown in the drawings, including the angular slope of the floor. The bin 10 is conventional and does not constitute a part of the present invention.

The present invention is directed towards a modular aeration assembly or system 20 which can be installed or retrofit into an existing bin. The aerator assembly 20 generally includes a cylindrical tower 22 supported above the floor 12 of the bin 10 by a plurality of legs 24. Each leg 24 includes a foot 26 pivotally mounted to the lower end of the leg so as to accommodate bins having floors with different angled slopes.

Figure 7:
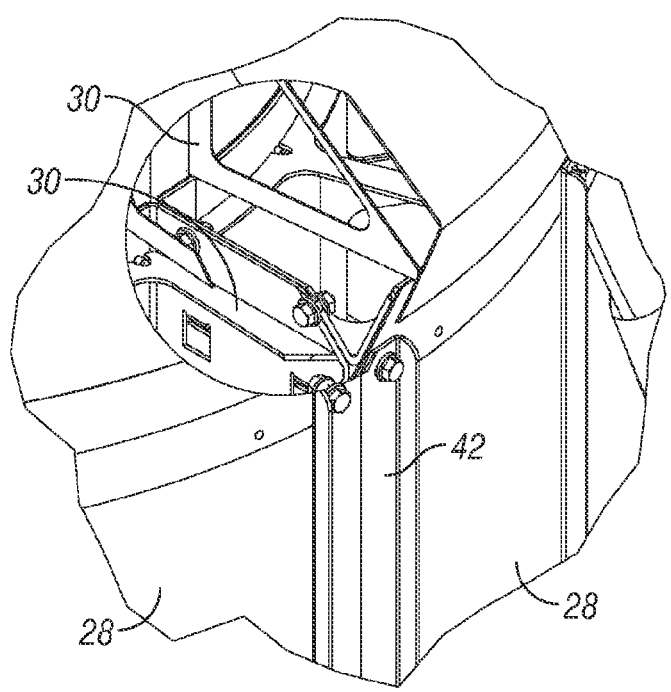
FIG. 7 is an enlarged partial perspective view of a pair of adjacent wall segments, taken along lines 7-7 of FIG. 3, with a portion of the top wall cut away to show the internal frames of the wall segments.
Figure 8:
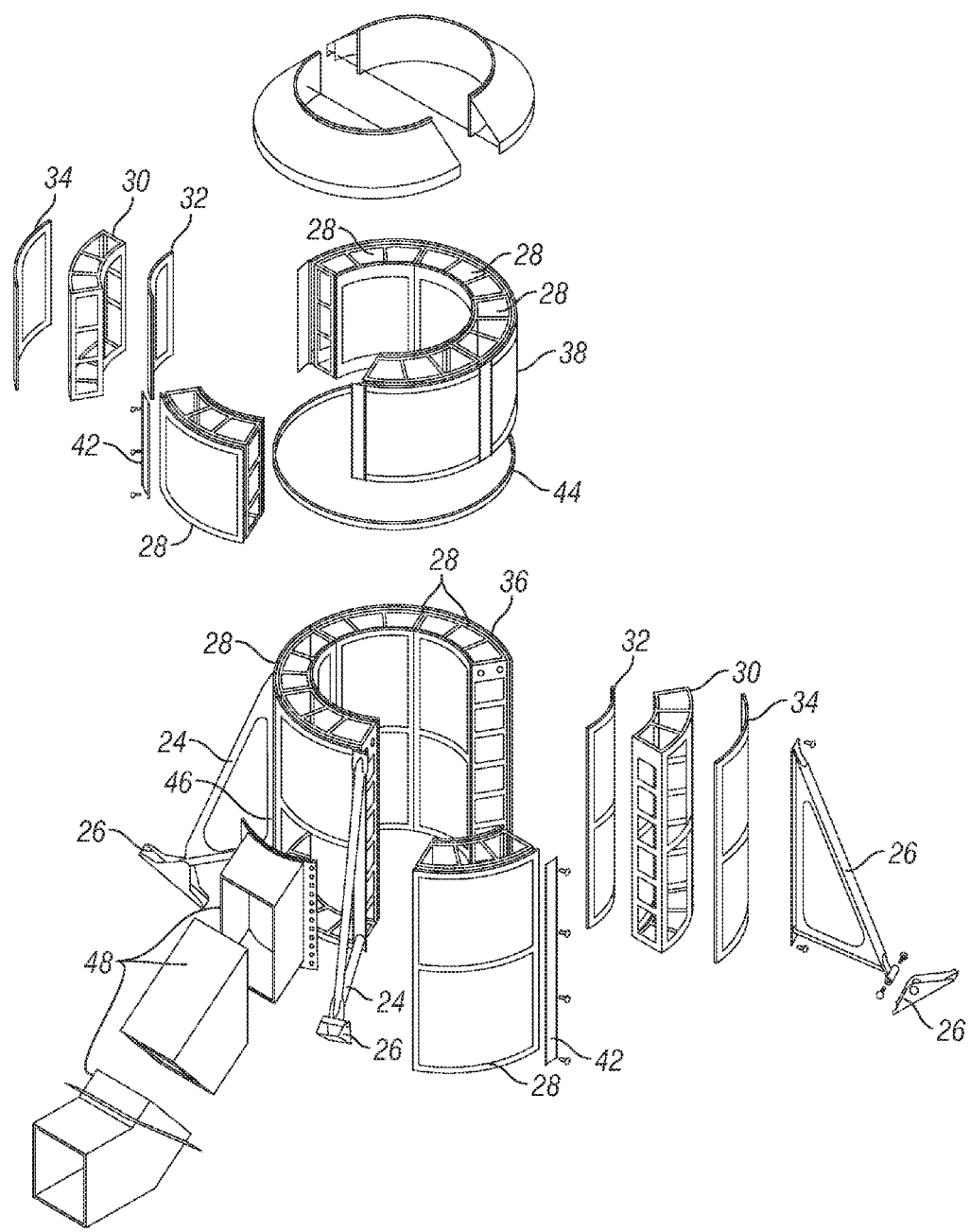
FIG. 8 is an exploded perspective view of the components of the modular aeration assembly of the present invention.

The tower 22 is formed by a plurality of curved wall segments 28. Each wall segment 28 includes an internal frame 30 with inner and outer skins 32, 34. The frames 30 extending substantially along the full height of the wall segments so as to provide internal structural support for the screens 32, 34. The skins 32, 34 are perforated or louvered so as to function as a screen, and are attached to the frame 30 in any convenient manner, such as by screws. The frames 30 of adjacent wall segments 28 are bolted together, as seen in FIG. 7, so as to form the cylindrical tower 22. In the preferred embodiment, first and second sets 36, 38 of wall segments 28 are stacked one upon the other so as to extend the height of the tower 22. As seen in FIG. 8, the opposite lateral sides of each wall segment 28 are open so that air may flow between adjacent wall segments 28. Similarly, the upper ends of the wall segments 28 in the first or lower set 36 are open, as is the lower ends of the wall segments 28 in the second or upper set 38, so as to allow for vertical air flow between stacked wall segments.

A cap 40 made of two or more pieces is bolted to the top of the tower 22. A channel jointer 42 is secured to adjacent wall segments 28 so as to cover the vertical joint between the wall segments. Similarly, a band 44, formed of one or more pieces, covers the joint between the upper and lower sets 36, 38 of wall segments 28.

Figure 2:
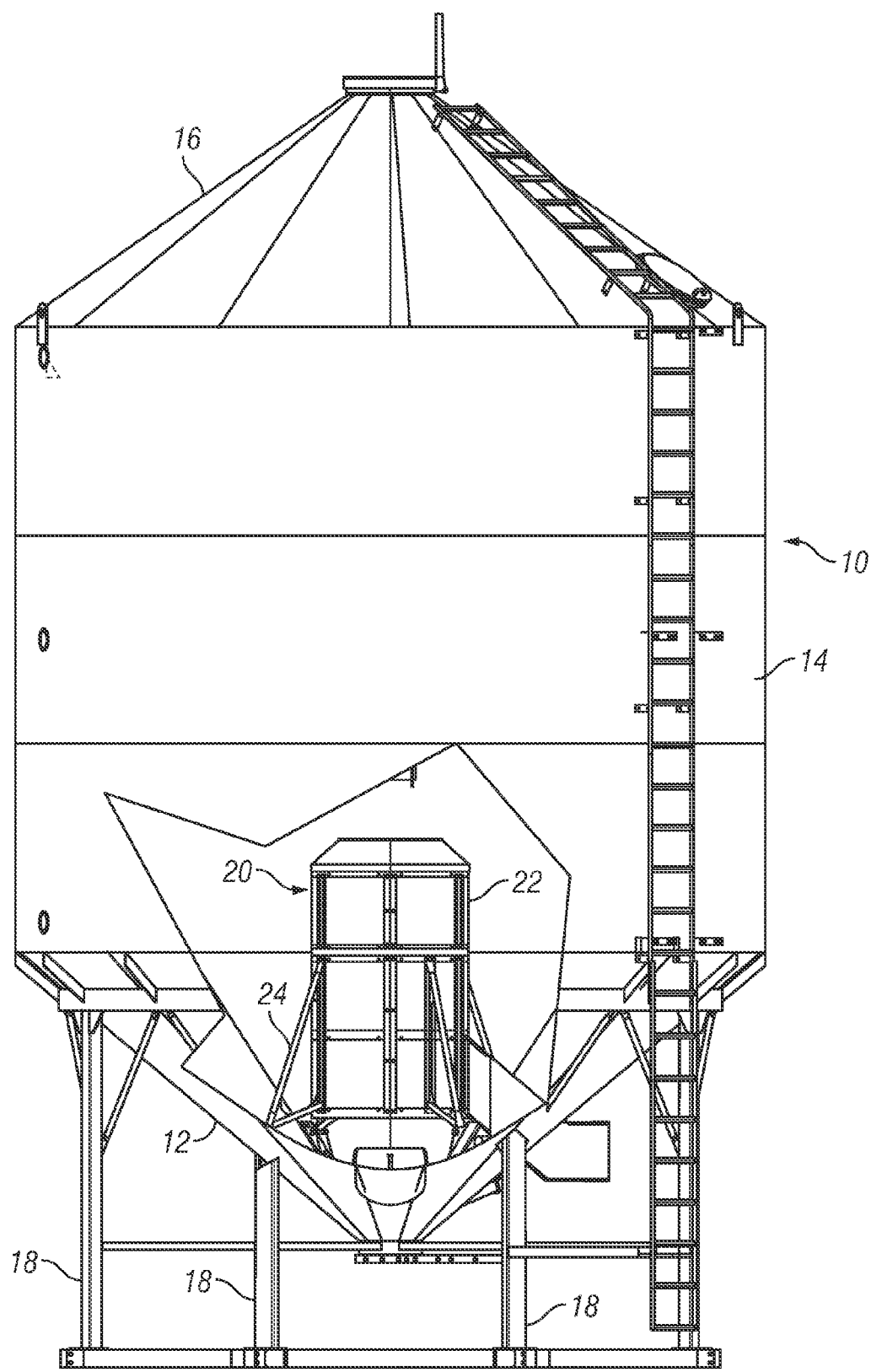
FIG. 2 is a side elevation view of the bin of FIG. 1, with a portion of the bin wall cut away to show the modular aeration assembly installed in the bin.
Figure 3:
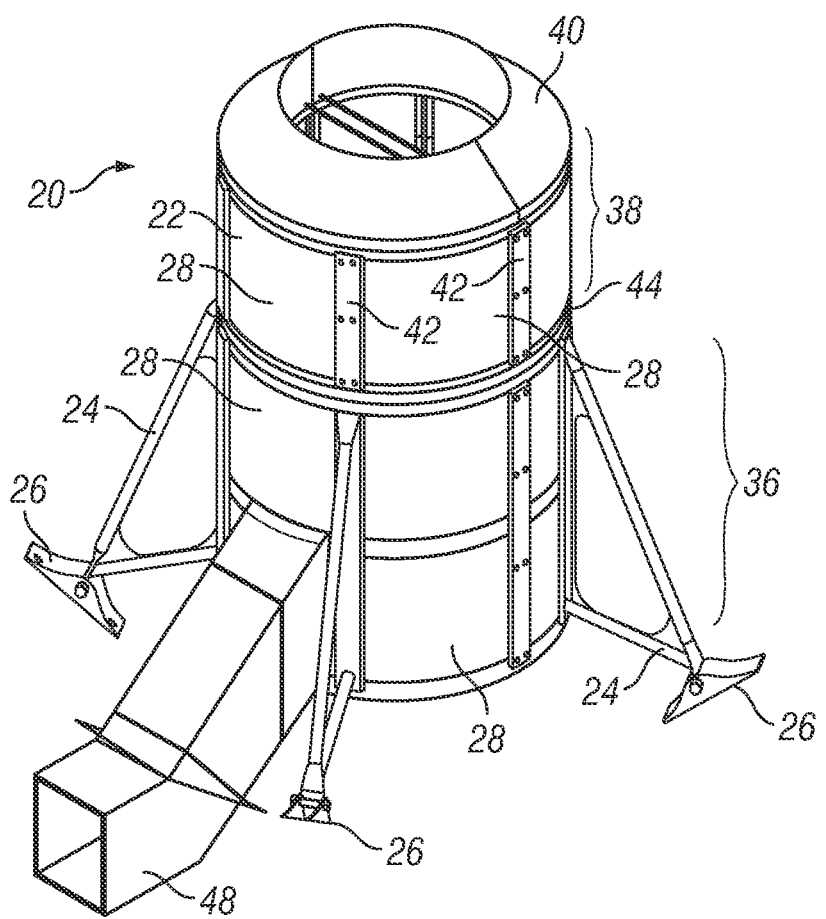
FIG. 3 is a perspective view of the modular aeration assembly of the present invention.
Figure 4:
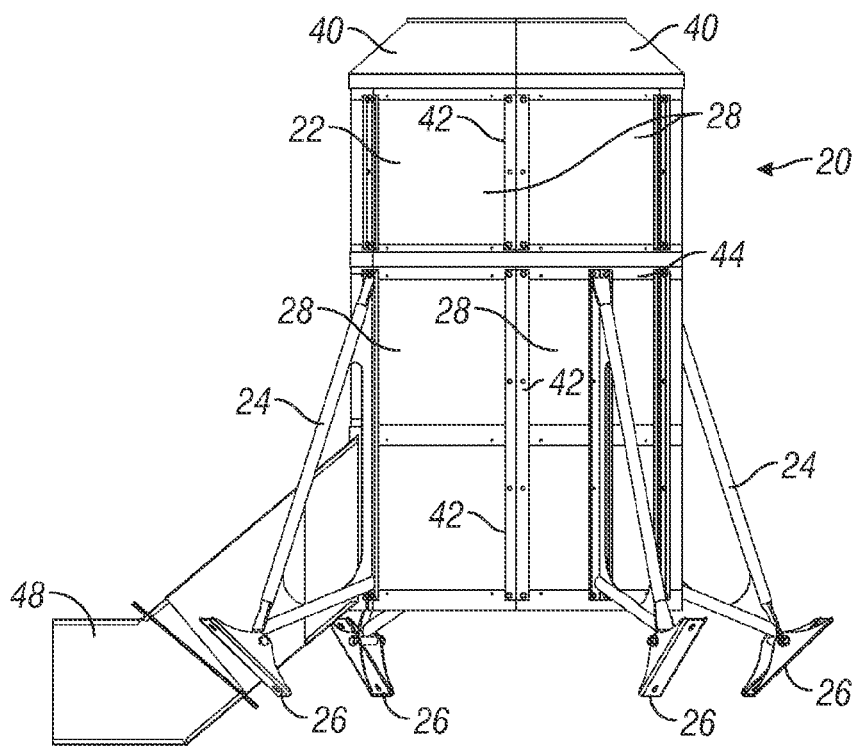
FIG. 4 is a side elevation view of the modular aeration assembly of the present invention.
Figure 5:
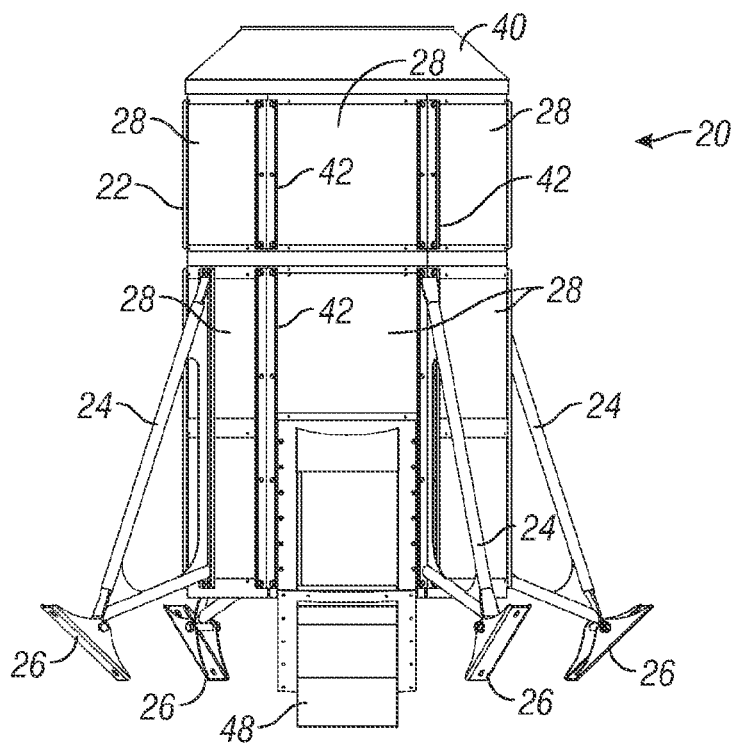
FIG. 5 is another side elevation view of the assembly, rotated approximately 90° from FIG. 4.
Figure 6:
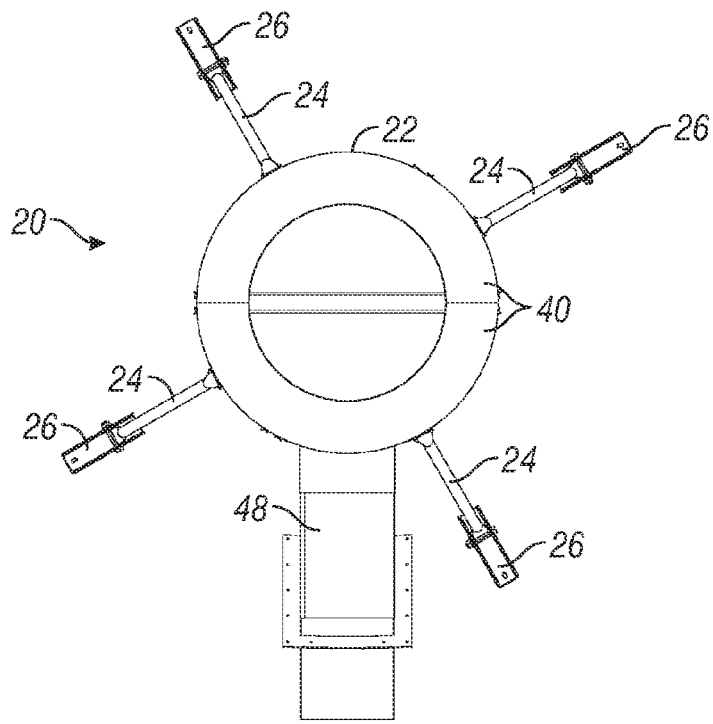
FIG. 6 is a top plan view of the modular aeration assembly of the present invention.

One of the wall segments 28 includes an air inlet 46. A multi-piece air duct 48 extends between the air inlet 46 and an air source, such as a fan, located outside the bin 10. An opening is provided in the sidewall 14 of the bin through which the air duct 48 extends, as seen in FIG. 2.

All of the components of the aeration assembly 20 are sized so as to pass through the manhole of the bin 10. Thus, the components can be separately moved into the bin 10 through the manhole, and then assembled inside the bin by a single person. This ability to retrofit the aeration assembly 20 into an existing bin 10, or to replace a damaged aeration system without cutting a large hole in the sidewall 14 of the bin 10 is a substantial advantage over the prior art aeration systems, such as The Rocket.

In the assembly process, the components of the aerator assembly 20 are moved through the manhole into the bin 10. The wall segments 28 are assembled to form the tower 22. The air duct 48 is then connected to the tower 22. The legs 24 support the tower 22 above the floor 12 of the bin 10. When the exterior fan is actuated, air flows through the air duct 48 and air inlet 46 into the space between the inner and outer skins 32, 34, and then passes through the perforations in the skins 32, 34 to facilitate drying of grain in the bin 10. The openings between the adjacent stacked wall segments 28 permit unrestricted air flow between the segments. The perforations or louvers in the skins or screens 32, 34 are designed to prevent material from entering the wall segments 28, while allowing air to flow outwardly from the interior of the wall segments 28.

Thus, the aeration assembly 20 of the present invention maintains desirable temperature and moisture content levels of the stored material within the bin 10 at an acceptable range so as to prevent spoilage.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A grain aeration assembly for a bin with a hopper bottom, a sidewall, and a manhole in the sidewall, comprising:
   a first set of wall segments sized to pass through the manhole for assembly to form a cylindrical tower extending upwardly inside the bin;
   a plurality of legs extending between the tower and the hopper bottom;
   each wall segment having an internal frame with opposite upper and lower ends and opposite side edges, and having spaced apart inner and outer perforated skins mounted on the frame;
   the frames of adjacent wall segments being secured together to form the cylindrical tower; and
   an air inlet in one of the wall segments to introduce drying air into a space between the inner and outer skins for exiting through the perforations.

2. The grain aeration assembly of claim 1 wherein the frames of adjacent wall segments are bolted together inside the bin after the segments pass through the manhole.

3. The grain aeration assembly of claim 1 wherein the side edges are substantially open to allow air flow between adjacent wall segments.

4. The grain aeration assembly of claim 1 further comprising a second set of wall segments stacked on top of the first set of wall segments so as to increase the height of the tower.

5. The grain aeration assembly of claim 4 wherein the upper end of each of the wall segments of the first set is open and each of the wall segments of the second set have open lower ends to allow air flow vertically between adjacent stacked wall segments of the first and second sets.

6. The grain aeration assembly of claim 1 wherein each leg has a foot pivotally connected thereto.

7. The grain aeration assembly of claim 1 further comprising duct sections extending between the air inlet and an air source outside the bin.

8. The grain aeration assembly of claim 7 Wherein the duct sections are assembled inside the bin.

9. The grain aeration assembly of claim 1 wherein the legs extend to an upper end of the tower.

10. A modular aeration assembly for retro-fit installation inside a grain bin, comprising:
    a plurality of curved wall segments sized to pass through an opening in the bin, and each segment having an internal frame with inner and outer perforated skins;
    an air duct sized to pass through the opening;
    adjacent wall segment frames being joined side by side;
    the wall segments being adapted for erection inside the bin to form an upstanding tower after passing through the bin opening; and
    the air duct being connected to the tower to supply drying air to each wall segment.

11. The modular aeration assembly of claim 10 wherein the air duct supplies air to a space between the skins for expulsion through the skins.

12. The modular aeration assembly of claim 10 further comprising a plurality of legs sized to pass through the bin opening and adapted to be connected to the tower and a floor of the bin to support the tower inside the bin.

13. The modular aeration assembly of claim 10 wherein each wall segment is substantially rectangular with parallel opposite sides.

14. The modular aeration assembly of claim 13 further comprising a plurality of legs to support the wall segments in the grain bin, the legs being connected to selected wall segments adjacent upper ends of the segments.

* * * * *

UNITED STATES PATENT AND TRADEMARK OFFICE
CERTIFICATE OF CORRECTION

| | | |
|---|---|---|
| PATENT NO. | : 8,720,079 B2 | Page 1 of 1 |
| APPLICATION NO. | : 12/868861 | |
| DATED | : May 13, 2014 | |
| INVENTOR(S) | : Juan Neufeld et al. | |

It is certified that error appears in the above-identified patent and that said Letters Patent is hereby corrected as shown below:

In the Claims:

Col. 4, Claim 8, Line 29:
DELETE after claim 7 "Wherein"
ADD after claim 7 --wherein--

Signed and Sealed this
Twelfth Day of August, 2014

Michelle K. Lee
*Deputy Director of the United States Patent and Trademark Office*